US008367267B2

(12) United States Patent
Frey et al.

(10) Patent No.: US 8,367,267 B2
(45) Date of Patent: Feb. 5, 2013

(54) HIGH DURABILITY FUEL CELL COMPONENTS WITH CERIUM OXIDE ADDITIVES

(75) Inventors: Matthew H. Frey, Cottage Grove, MN (US); Daniel M. Pierpont, North St. Paul, MN (US); Steven J. Hamrock, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1269 days.

(21) Appl. No.: 11/261,053

(22) Filed: Oct. 28, 2005

(65) Prior Publication Data
US 2007/0099052 A1    May 3, 2007

(51) Int. Cl.
 $H01M\ 8/10$ (2006.01)
 $H01M\ 8/00$ (2006.01)
 $H01M\ 4/82$ (2006.01)
 $H01M\ 6/00$ (2006.01)

(52) U.S. Cl. ........ 429/495; 429/492; 429/493; 429/494; 429/482; 429/535; 29/623.5

(58) Field of Classification Search .................. 429/482, 429/492, 493, 494, 495, 535, 623.5
See application file for complete search history.

(56) References Cited

U.S. PATENT DOCUMENTS

| | | | |
|---|---|---|---|
| 3,369,938 A | 2/1968 | Kroeger et al. | |
| 3,382,105 A | 5/1968 | McBryar et al. | |
| 4,021,369 A | 5/1977 | Lyons | |
| 4,284,835 A | 8/1981 | Kim et al. | |
| 4,340,276 A | 7/1982 | Maffitt et al. | |
| 4,358,545 A | 11/1982 | Ezzell et al. | |
| 4,416,801 A | 11/1983 | Waller | |
| 4,433,082 A | 2/1984 | Grot | |
| 4,568,598 A | 2/1986 | Bilkadi et al. | |
| 4,741,744 A | 5/1988 | Wu et al. | |
| 4,752,369 A * | 6/1988 | Caldwell et al. | 204/252 |
| 4,812,352 A | 3/1989 | Debe | |
| 4,824,835 A | 4/1989 | Mertens et al. | |
| 4,866,099 A | 9/1989 | Hendy | |
| 5,039,561 A | 8/1991 | Debe | |
| 5,176,786 A | 1/1993 | Debe | |
| 5,186,877 A | 2/1993 | Watanabe | |
| 5,221,455 A | 6/1993 | Hanada et al. | |
| 5,225,391 A | 7/1993 | Stonehart et al. | |
| 5,294,232 A | 3/1994 | Sakairi et al. | |
| 5,336,558 A | 8/1994 | Debe | |
| 5,338,430 A | 8/1994 | Parsonage et al. | |
| 5,472,799 A | 12/1995 | Watanabe | |
| 5,523,181 A | 6/1996 | Stonehart et al. | |
| 5,766,787 A | 6/1998 | Watanabe et al. | |
| 5,766,788 A | 6/1998 | Inoue et al. | |
| 5,840,192 A | 11/1998 | El Moussaoui et al. | |
| 5,879,827 A | 3/1999 | Debe et al. | |
| 5,879,828 A | 3/1999 | Debe et al. | |
| 5,958,822 A * | 9/1999 | Beckerbauer et al. | 502/168 |
| 6,040,077 A | 3/2000 | Debe et al. | |
| 6,059,943 A * | 5/2000 | Murphy et al. | 204/296 |
| 6,156,184 A | 12/2000 | Antonucci et al. | |
| 6,242,135 B1 * | 6/2001 | Mushiake | 429/304 |
| 6,319,293 B1 | 11/2001 | Debe et al. | |
| 6,335,112 B1 | 1/2002 | Asukabe et al. | |
| 6,624,328 B1 | 9/2003 | Guerra | |
| 6,630,263 B1 | 10/2003 | McElroy | |
| 6,635,384 B2 | 10/2003 | Bahar et al. | |
| 6,649,295 B2 | 11/2003 | Hamrock et al. | |
| 6,680,138 B1 | 1/2004 | Honma et al. | |
| 6,864,006 B2 | 3/2005 | Honma et al. | |
| 7,220,509 B2 * | 5/2007 | Merzougui et al. | 429/33 |
| 7,879,475 B2 | 2/2011 | Toyoda | |
| 7,989,115 B2 | 8/2011 | Durante | |
| 2002/0004453 A1 | 1/2002 | Haugen et al. | |
| 2002/0015875 A1 | 2/2002 | Kim | |
| 2002/0058213 A1 | 5/2002 | Datz et al. | |
| 2002/0076594 A1 | 6/2002 | Fukuda et al. | |
| 2002/0093008 A1 | 7/2002 | Kerres et al. | |
| 2002/0132157 A1 | 9/2002 | Finkelshtain et al. | |
| 2003/0008196 A1 | 1/2003 | Wessel et al. | |
| 2003/0013004 A1 | 1/2003 | Oyanagi et al. | |

(Continued)

FOREIGN PATENT DOCUMENTS

EP    0 459 820 B1    4/1991
EP    0 631 337 B1    7/2000

(Continued)

OTHER PUBLICATIONS

Dupont Nafion PFSA Products Technical Information sheet, pp. 1-4, Feb. 2004.*
Goering et al., "Role of Ion-Exchange Membrane Morphology and Sorption Properties in Facilitated Transport di-olefin/mono-olefin Separations", Journal of Membrane Science, vol. 144, 1998, pp. 133-143.
M. Debe, A. Steinbach, K. Lewinski, G. Haugen, G. Vernstrom, R. Atanasoski, A. Hester, P. Turner, R. Ziegler, J. Larson, M. Hicks, and P. Serim; "Activities of Low Pt Loading, Carbon-Less, Ultra-Thin Nanostructured Film-Based Electrodes for PEM Fuel Cells and Roll-Good Fabricated MEA Performances in Single Cells and Stacks", 2003 Fuel Cell Seminar, Fuel Cells for Secure, Sustainable Energy, Abstracts, Nov. 3-7, 2003, Miami Beach, Florida, Fontainebleau Hilton Hotel, pp. 812-815.
G. M. Chow et al.; "Fabrication of Biologically Based Microstructure Composites for Vacuum Field Emission", Materials Science and Engineering, A158, 1992, pp. 1-6.

(Continued)

*Primary Examiner* — Patrick Ryan
*Assistant Examiner* — Julian Anthony
(74) *Attorney, Agent, or Firm* — Philip Y. Dahl; Stephen L. Crooks

(57) ABSTRACT

A fuel cell membrane electrode assembly is provided comprising a polymer electrolyte membrane which comprises a highly fluorinated polymer electrolyte and at least one cerium oxide compound dispersed therein. In addition, a method of making a fuel cell polymer electrolyte membrane is provided comprising the steps of: a) providing a highly fluorinated polymer electrolyte comprising acidic functional groups; b) dispersing therein at least one cerium oxide in an amount so as to provide between 0.01 and 5 percent of the total weight of the polymer electrolyte membrane; and c) thereafter forming a polymer electrolyte membrane comprising said polymer electrolyte.

22 Claims, 1 Drawing Sheet

U.S. PATENT DOCUMENTS

| | | | |
|---|---|---|---|
| 2004/0043283 A1 | 3/2004 | Cipollini et al. |
| 2004/0048129 A1 | 3/2004 | Taft, III et al. |
| 2004/0048466 A1 | 3/2004 | Gore et al. |
| 2004/0053098 A1 | 3/2004 | Schiffrin et al. |
| 2004/0116742 A1 | 6/2004 | Guerra |
| 2004/0121210 A1 | 6/2004 | Hamrock et al. |
| 2004/0251450 A1 | 12/2004 | Kerres et al. |
| 2005/0069755 A1 | 3/2005 | Vernstrom et al. |
| 2005/0136308 A1 | 6/2005 | Andrews et al. |
| 2006/0019140 A1 | 1/2006 | Kawazoe et al. |
| 2006/0046120 A1 | 3/2006 | Merzougui et al. |
| 2006/0099475 A1 | 5/2006 | Watanabe et al. |
| 2006/0099476 A1 | 5/2006 | Watakabe |
| 2006/0166069 A1 | 7/2006 | Min |
| 2006/0231484 A1 | 10/2006 | Haring et al. |
| 2006/0280985 A1 | 12/2006 | Toyoda |
| 2007/0099053 A1 | 5/2007 | Frey et al. |

FOREIGN PATENT DOCUMENTS

| | | |
|---|---|---|
| EP | 1 133 806 B1 | 9/2002 |
| EP | 1 657 772 | 5/2006 |
| EP | 1 662 595 | 5/2006 |
| EP | 1 772 919 | 4/2007 |
| GB | 149233 | 1/1922 |
| GB | 1 449 233 | 9/1976 |
| GB | 1534359 | 6/1978 |
| JP | 54-82042 A2 | 6/1979 |
| JP | 2000-106203 | 4/2000 |
| JP | 2001-118591 | 4/2001 |
| JP | 2001-321664 | 11/2001 |
| JP | 2003-059497 | 2/2003 |
| JP | 2003-077492 A | 3/2003 |
| JP | 2003-123777 A2 | 4/2003 |
| JP | HEI-2003-282037 | 10/2003 |
| JP | 2004/018573 | 1/2004 |
| JP | 2004-134294 | 4/2004 |
| JP | 1 627 3384 | 9/2004 |
| JP | 2005-019232 A | 1/2005 |
| JP | 2006-099999 | 4/2006 |
| JP | 2006-107914 | 4/2006 |
| JP | 2006-260811 | 9/2006 |
| JP | 2006-324094 | 11/2006 |
| KR | 2000-063843 | 6/2000 |
| WO | WO 00/24074 | 4/2000 |
| WO | WO 01/54216 A2 | 7/2001 |
| WO | WO 02/061871 A2 | 8/2002 |
| WO | WO 03/007412 A1 | 1/2003 |
| WO | WO 03/072854 A2 | 9/2003 |
| WO | WO 2005/060039 A1 | 6/2005 |

OTHER PUBLICATIONS

K. K. Kam, M. K. Debe, R. J. Poirier, and A. R. Drube; "Summary Abstract: Dramatic Variation of the Physical Microstructure of a Vapor Deposited Organic Thin Film", J. Vac. Sci. Technol, A, 5(4), Jul./Aug. 1987, pp. 1914-1916.

M. K. Debe, K. K. Kam, J. C. Liu, and R. J. Poirier; "Vacuum Vapor Deposited Thin Films of a Perylene Dicarboximide Derivative: Microstructure Versus Deposition Parameters", J. Vac. Sci. Technol. A, 6 (3), May/Jun. 1988, pp. 1907-1911.

M. K. Debe and R. J. Poirier; "Effect of Gravity on Copper Phthalocyanine Thin Films III: Microstructure Comparisons of Copper Phthalocyanine Thin Films Grown in Microgravity and Unit Gravity", Thin Solid Films, vol. 186, 1990, pp. 327-347.

Y. Sadaoka, T. A. Jones, G. S. Revell, W. Gopel; Effects of Morphology on $NO_2$ Detection in Air at Room Temperature With Phthalocyanine Thin Films, Journal of Materials Science, vol. 25, 1990, pp. 5257-5268.

S. Ohnuma, Y. Nakanouchi, and T. Masumoto; "Amorphous Ultrafine Metallic Particles Prepared by Sputtering Method", Rapidly Quenched Metals, Proc. of the Fifth Int. Conf. on Rapidly Quenched Metals, Wurzburg, Germany, Sep. 3-7, 1984, S. Steeb et al., eds., Elsevier Science Publisher B.V., New York, 1985, pp. 1117-1124.

P. K. Lee and M. K. Debe, "Measurement and Modeling of the Reflectance-Reducing Properties of Gradient Index Microstructured Surfaces", Photographic Science and Engineering, vol. 24, (4), Jul./Aug. 1980, pp. 211-216.

H. Tang, J. H. Chen, Z. P. Huang, D. Z. Wang, Z. F. Ren, L. H. Nie, Y. F. Kuang, and S. Z. Yao; "High Dispersion and Electrocatalytic Properties of Platinum on Well-Aligned Carbon Nanotube Arrays", Carbon, vol. 42, 2004, pp. 191-197.

A. Bonakdarpour et al., "Corrosion of Transition Metals, in $Pt_{1-x}M_x$ Proton Exchange Membrane Fuel Cell Electrocatalysts", 2004 Fall Meeting of the Electrochemical Society of Japan, Hawaii, Oct. 3-8, 2004.

U.S. Appl. No. 10/945,178, filed Sep. 20, 2004, "Fuel Cell Durability", now pending.

U.S. Appl. No. 10/944,998, filed Sep. 20, 2004, "Durable Fuel Cell", now pending.

U.S. Appl. No. 11/248,441, filed Oct. 12, 2005, "Ternary Nanocatalyst and Method of Making", now pending.

Sang-Hee Kwak, TaeHyun Yang, Chang-Soo Kim, and Ki Hyun Yoon; "Performance Evaluation of Platinum Dispersed Self-Humidifying Polymer Electrolyte Membrane Prepared by Using RF Magnetron Sputter", *Journal of the Korean Ceramic Society*, vol. 40, No. 2, 2003, pp. 118-122.

A. Michas, J. M. Kelly, R. Durand, M. Pineri, and J.M.D. Coey; "Preparation, Characterization and Catalytic Properties of Perfluorosulfonated Ion-Exchange Membranes Containing Surface-Concentrated, Hydrated Ruthenium Oxide Particles"; Journal of Membrane Science, Elsevier Science Publishers B.V., Amsterdam—Printed in The Netherlands; vol. 29, No. 3, Dec. 15, 1986, pp. 239-257.

Mikael Ludvigsson, Jan Lindgren, and Jörgen Tegenfeldt; "Incorporation and Characterisation of Oxides of Manganese, Cobalt, and Lithium Into Nafion 117 Membranes", Journal Materials Chemistry, vol. 11, Feb. 15, 2001, pp. 1269-1276.

Fuqiang Liu, Baolian Yi, Danmin Xing, Jingrong Yu, Zhongjun Hou, Yongzhu Fu; "Development of Novel Self-Humidifying Composite Membranes for Fuel Cells", Journal of Power Sources, vol. 124, 2003, pp. 81-89.

J. Guan and G. Li, "Studies on Preparation of Ultrafine MnO Particles and Its Eletrocatalytic Performance in PEMFC", Huaxue Shijie 43 [1] (2002) pp. 7-9.

S. Kawatsu and M. Iwase, "Electrocatalysts for Polymer Electrolyte Fuel Cells", Jidosha Gijutsukai Ronbunshu (Transaction of the Society Automotive Engineers of Japan), vol. 28, No. 4, (Oct. 1997), pp. 39-42.

* cited by examiner

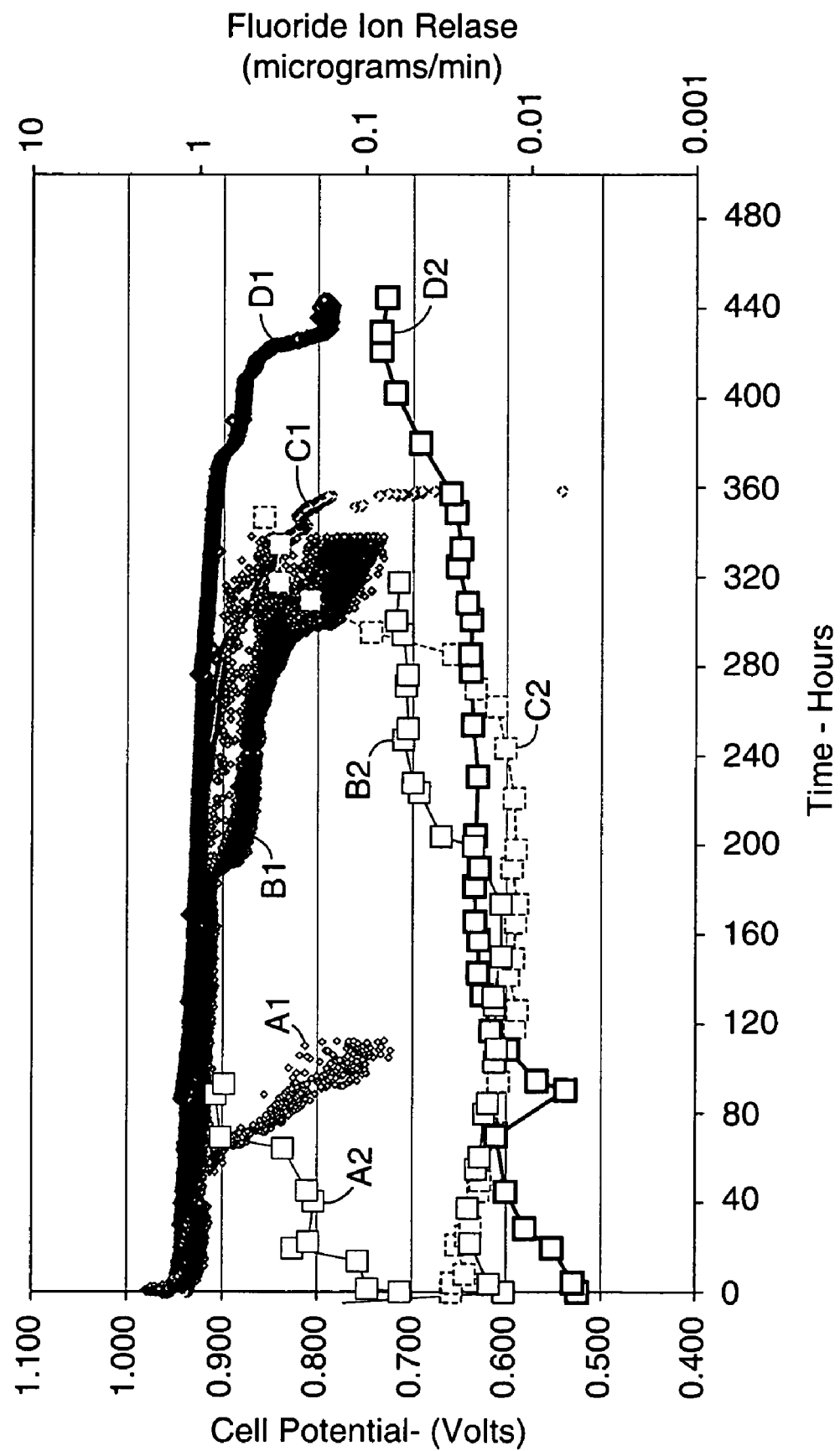

HIGH DURABILITY FUEL CELL COMPONENTS WITH CERIUM OXIDE ADDITIVES

This invention was made with Government support under Cooperative Agreement DE-FC36-02AL67621 awarded by DOE. The Government has certain rights in this invention.

FIELD OF THE INVENTION

This invention relates to fuel cell membrane electrode assemblies and fuel cell polymer electrolyte membranes comprising cerium oxides which demonstrate increased durability, and methods of making same.

BACKGROUND OF THE INVENTION

U.S. Pat. No. 6,335,112 (Asukabe) purportedly discloses a polymer electrolyte membrane comprising a hydrocarbon-based solid polymer electrolyte which contains a catalyst that decomposes peroxides. The references calls out numerous elements for use in the catalyst.

US 2003/0008196 (Wessel) purportedly discloses a fuel cell electrode containing a catalyst that decomposes peroxides. The references calls out numerous elements for use in the catalyst.

US 2002/0093008 and US 2004/0251450 (Kerres) purportedly disclose a composite membrane which includes a percolating ceramic nanoparticle network of very small particles for proton conduction.

Copolymers of tetrafluoroethylene (TFE) and a co-monomer according to the formula: $FSO_2$—$CF_2$—$CF_2$—O—CF($CF_3$)—$CF_2$—O—CF=$CF_2$ are known and sold in sulfonic acid form, i.e., with the $FSO_2$— end group hydrolyzed to $HSO_3$—, under the trade name Nafion® by DuPont Chemical Company, Wilmington, Del. Nafion® is commonly used in making polymer electrolyte membranes for use in fuel cells.

Copolymers of tetrafluoroethylene (TFE) and a co-monomer according to the formula: $FSO_2$—$CF_2$—$CF_2$—O—CF=$CF_2$ are known and used in sulfonic acid form, i.e., with the $FSO_2$— end group hydrolyzed to $HSO_3$—, in making polymer electrolyte membranes for use in fuel cells.

U.S. patent application Ser. No. 10/325,278, filed Dec. 19, 2002, the disclosure of which is incorporated herein by reference, discloses a polymer electrolyte membrane having a thickness of 90 microns or less and comprising a polymer, said polymer comprising a highly fluorinated backbone and recurring pendant groups according to the formula:

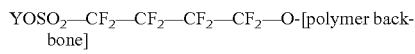
$YOSO_2$—$CF_2$—$CF_2$—$CF_2$—$CF_2$—O—[polymer backbone]

where Y is $H^+$ or a monovalent cation such as an alkali metal cation. Typically, the membrane is a cast membrane. Typically, the polymer has a hydration product of greater than 22,000. Typically, the polymer has an equivalent weight of 800-1200.

SUMMARY OF THE INVENTION

Briefly, the present invention provides a fuel cell membrane electrode assembly comprising a polymer electrolyte membrane which comprises a highly fluorinated polymer electrolyte and at least one cerium oxide compound dispersed therein. Typically, the distribution of the cerium oxide compound across the thickness of said polymer electrolyte membrane is uniform. Typically, the distribution of the polymer electrolyte across the thickness of the polymer electrolyte membrane is uniform. Typically the highly fluorinated polymer electrolyte is perfluorinated. Typically the cerium oxide is present in an amount of between 0.01 and 5 weight percent relative to the total weight of the polymer electrolyte membrane; more typically between 0.1 and 1 weight percent and most typically between 0.2 and 0.3 weight percent. Typically the cerium oxide is present in an amount of less than 1% by volume relative to the total volume of the polymer electrolyte membrane, more typically less than 0.8% by volume, and more typically less than 0.5% by volume. The cerium oxide may be $CeO_2$. The cerium oxide may be $Ce_2O_3$. Typically, the polymer electrolyte has an equivalent weight of 1000 or less, more typically 900 or less, and more typically 800 or less. The polymer electrolyte may comprise pendent groups according to the formula: —O—$CF_2$—$CF_2$—$CF_2$—$CF_2$—$SO_3H$ or according to the formula: —O—$CF_2$—CF($CF_3$)—O—$CF_2$—$CF_2$—$SO_3H$.

In another aspect, the present invention provides a method of making a fuel cell polymer electrolyte membrane comprising the steps of: a) providing a highly fluorinated polymer electrolyte comprising acidic functional groups; b) dispersing therein at least one cerium oxide in an amount so as to provide between 0.01 and 5 percent of the total weight of the polymer electrolyte membrane; and c) thereafter forming a polymer electrolyte membrane comprising said polymer electrolyte. Typically, the distribution of cerium oxide across the thickness of said polymer electrolyte membrane is uniform. Typically, the distribution of the polymer electrolyte across the thickness of the polymer electrolyte membrane is uniform. Typically the highly fluorinated polymer electrolyte is perfluorinated. Typically the cerium oxide is present in an amount of between 0.01 and 5 weight percent relative to the total weight of the polymer electrolyte membrane; more typically between 0.1 and 1 weight percent and most typically between 0.2 and 0.3 weight percent. Typically the cerium oxide is present in an amount of less than 1% by volume relative to the total volume of the polymer electrolyte membrane, more typically less than 0.8% by volume, and more typically less than 0.5% by volume. The cerium oxide may be $CeO_2$. The cerium oxide may be $Ce_2O_3$. Typically, the polymer electrolyte has an equivalent weight of 1000 or less, more typically 900 or less, and more typically 800 or less. The polymer electrolyte may comprise pendent groups according to the formula: —O—$CF_2$—$CF_2$—$CF_2$—$CF_2$—$SO_3H$ or according to the formula: —O—$CF_2$—CF($CF_3$)—O—$CF_2$—$SO_3H$.

In another aspect, the present invention provides a method of making a fuel cell membrane electrode assembly comprising any method herein for making a polymer electrolyte membrane, and additionally comprising the step of: d) forming a membrane electrode assembly comprising that polymer electrolyte membrane.

In this application:

"uniform" distribution of an additive in a polymer membrane means that the amount of additive present does not vary more than +/−90%, more typically not more than +/−50% and more typically not more than +/−20%;

"equivalent weight" (EW) of a polymer means the weight of polymer which will neutralize one equivalent of base;

"polyvalent cation" means a cation having a charge of 2+ or greater;

"highly fluorinated" means containing fluorine in an amount of 40 wt % or more, typically 50 wt % or more and more typically 60 wt % or more; and "acid form" means, with regard to an anionic functional group, that it is neutralized by a proton.

It is an advantage of the present invention to provide a fuel cell membrane electrode assembly and polymer electrolyte membrane and methods of making same which provide increased durability.

BRIEF DESCRIPTION OF THE DRAWING

FIG. 1 is a graph reporting results from a Fuel Cell Lifetime Test for four membrane electrode assemblies (MEA's), including cell potential for the Example 9C comparative MEA (Trace A1, left-hand scale), cell potential for two Example 10 MEA's of the invention (Traces C1 and D1, left-hand scale), cell potential for a comparative MEA comprising Mn salt additive (Trace B1, left-hand scale), fluoride ion release rate for the Example 9C comparative MEA (Trace A2, right-hand scale), fluoride ion release rate for two Example 10 MEA's of the invention (Traces C2 and D2, right-hand scale), and fluoride ion release rate for a comparative MEA comprising Mn salt additive (Trace B2, right-hand scale).

DETAILED DESCRIPTION

The present invention provides a fuel cell membrane electrode assembly comprising a polymer electrolyte membrane which comprises a highly fluorinated or perfluorinated polymer electrolyte and dispersed therein at least one cerium oxide, such as $CeO_2$ or $Ce_2O_3$, where the distribution of the cerium oxide across the thickness of the polymer electrolyte membrane typically is uniform.

A membrane electrode assembly (MEA) or polymer electrolyte membrane (PEM) according to the present invention may be useful in electrochemical cell such as a fuel cell. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

The PEM according to the present invention may comprise any suitable polymer electrolyte. The polymer electrolytes useful in the present invention typically bear anionic functional groups bound to a common backbone, which are typically sulfonic acid groups but may also include carboxylic acid groups, imide groups, amide groups, or other acidic functional groups. The polymer electrolytes useful in the present invention are highly fluorinated and most typically perfluorinated. The polymer electrolytes useful in the present invention are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2$—$CF_2CF_2CF_2CF_2$—O—$CF$=$CF_2$, described in U.S. patent application Ser. Nos. 10/322,254, 10/322,226 and 10/325,278, which are incorporated herein by reference. The polymer typically has an equivalent weight (EW) of 1200 or less and more typically 1100 or less. In some embodiments, polymers of unusually low EW can be used, typically 1000 or less, more typically 900 or less, and more typically 800 or less, often with improved performance in comparison to the use of higher EW polymer. Without wishing to be bound by theory, it is believed that the cerium oxide may strengthen the polymer by chelating and forming crosslinks between bound anionic groups.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, and most typically about 25 microns. Typically, the distribution of the polymer electrolyte across the thickness of the polymer electrolyte membrane is uniform, that is, uninterrupted by any added support structure.

In one embodiment of the present invention, one or more cerium oxide compounds, such as $CeO_2$ or $Ce_2O_3$, but more typically $CeO_2$, is dispersed in the polymer electrolyte prior to membrane formation. The cerium oxide compound may be crystalline or amorphous. The cerium oxide compound may contain cerium in the (IV) oxidation state, the (III) oxidation state, or both. In one embodiment, the cerium oxide compound is substantially free of metallic cerium. Alternately, the cerium oxide compound may contain both cerium oxide and metallic cerium. Alternately, the cerium oxide compound may be supported as a thin oxidation reaction product layer on a metallic cerium particle. In one embodiment, the cerium oxide compound may contain substantially no other metal elements. Alternately, the cerium oxide compound may contain other metal elements and thus may be considered a mixed metal oxide compound comprising cerium oxide. Examples of mixed metal oxide compounds comprising cerium oxide include solid solutions such as zirconia-ceria and multicomponent oxide compounds such as barium cerate. Typically the cerium oxide compound is mixed well with the polymer electrolyte to achieve substantially uniform distribution. Mixing is achieved by any suitable method, including milling, kneading and the like, and may occur with or without the inclusion of a solvent. The amount of cerium oxide compound added is typically between 0.01 and 5 weight percent based on the total weight of the final polymer electrolyte or PEM, more typically between 0.1 and 2 wt %, and more typically between 0.2 and 0.3 wt %. The cerium oxide compound is typically present in an amount of less than 1% by volume relative to the total volume of the polymer electrolyte membrane, more typically less than 0.8% by volume, and more typically less than 0.5% by volume. Cerium oxide may be in particles of any suitable size, typically between 1 and 5000 nm. In some embodiments, particle sizes of 200-5000 nm are preferred. In some embodiments, particle sizes of 500-1000 nm are preferred.

To make an MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

A PEM according to the present invention may additionally comprise a porous support, such as a layer of expanded PTFE or the like, where the pores of the porous support contain the polymer electrolyte. A PEM according to the present invention may comprise no porous support. A PEM according to the present invention may comprise a crosslinked polymer.

To make an MEA, GDL's may be applied to either side of a CCM by any suitable means. Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In use, the MEA according to the present typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

This invention is useful in the manufacture and operation of fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Membrane Preparation

The ionomer used in each of the following Examples is a copolymer of tetrafluoroethylene (TFE) and FSO2-CF2CF2CF2CF2-O—CF=CF2 (Comonomer A). Comonomer A was made according to the procedures disclosed in U.S. patent application Ser Nos. 10/322,254 and 10/322,226, incorporated herein by reference. Polymerization was performed by aqueous emulsion polymerization as described in U.S. patent application Ser. No. 10/325,278. The equivalent weight (EW) was 1000 (ion exchange capacity of 0.001 mol per gram). The ionomer was provided in a casting solution containing 22.3% solids in 70:30 n propanol/water. The casting solution contained iron at a level of less than 1 ppm. Membranes were made by casting the dispersions on window glass by hand-spread technique using the 0.020 inch (0.0508 cm) gap of a 4-inch multiple clearance applicator (Cat. No. PAR-5357, BYK-Gardner, Columbia, Md.). The membrane films were dried in ambient air for 15 minutes, followed by drying in an 80° C. air oven for 10 minutes, followed by heating in a 200° C. air oven for 15 minutes.

Peroxide Soak Test

Oxidative stability of the perfluorinated ionomer membranes made in several of the examples was tested as follows. A sample of membrane weighing between 0.03 g and 0.06 g was carefully weighed and then immersed in 50 g of hydrogen peroxide solution (1M starting concentration) in a glass jar. The jar was sealed and placed in an oven at 90-95° C. for 5 days. After a 5-day soak period, the sample was removed from solution, rinsed with DI water, dried at room temperature for at least three hours, and weighed. A raw weight loss figure was calculated. In order to control for differences in weight before and after soaking that can be attributed to changes in ambient relative humidity between day 0 and day 5, a separate piece of each membrane sample (that is never exposed to the peroxide) was weighed at the beginning and at the end of the soak period. To arrive at a corrected weight loss reading, the calculated figure for raw weight fraction remaining after soaking (for the soaked sample) was first divided by the weight fraction "remaining" for the piece of membrane that was not soaked. The latter treatment assumes that the effect of weight change due to a change in relative humidity is multiplicative in its deviating effect on measured weight loss for the soaked sample.

Acid Content Measurement

Titrations were performed to determine the acid content of ionomer membranes prepared with addition of ionic cerium. For each titration, a carefully weighed sample of ionomer film, approximately 0.05 g, was added to 100 ml of 0.1M NaCl solution. 0.05M NaOH solution was slowly added to the sample solution using a burette and the end point was determined using a pH meter. The amount of NaOH necessary to neutralize the acid was taken as the acid content of the membrane.

MEA Fabrication

Fuel cell membrane electrode assemblies (MEA's) having 50 cm$^2$ of active area were prepared as follows. Catalyst dispersions were prepared according to the method described in WO 2002/061,871, incorporated herein by reference. To prepare catalyst-coated membranes, anode and cathode layers were applied to membranes according to the decal transfer method described in the same reference, WO 2002/061,871. PTFE-treated carbon paper gas diffusion layers and polytetrafluoroethylene/glass composite gaskets were applied to the CCM by pressing in a Carver Press (Fred Carver Co., Wabash, Ind.) with 13.4 kN of force at 132° C. for 10 minutes.

MEA Lifetime Test

The MEA's were tested in a test station with independent controls of gas flow, pressure, relative humidity, and current or voltage (Fuel Cell Technologies, Albuquerque, N. Mex.). The test fixture included graphite current collector plates with quad-serpentine flow fields. MEA's were operated with H$_2$/air under subsaturated conditions at 90° C. with anode overpressure. The MEA's were subjected to an accelerated load cycle lifetime test by imposition of a variety of current density values. After each load cycle, the open circuit voltage (OCV) of the cell was measured and recorded. The general phenomenology for such a test protocol is for the OCV to decay monotonically, but with a distinct "knee" or pronounced increase in the decay rate. The point at which the decay rate increases can be taken as the lifetime of the MEA. As an alternative, a lower threshold voltage value can be selected to indicate the end of life for an MEA. The evolution rate of fluoride ions in the effluent water of the operating fuel cell was also measured by ion chromatography. A higher fluoride evolution rate indicates more rapid degradation for fluoropolymer membranes.

Comparative Example 1C

A control membrane was prepared according to details presented above, except that the casting dispersion included additional iron (500 ppm on a polymer weight basis), added as iron nitrate. 0.081 g of ferric nitrate (Fe(NO$_3$)$_3$-9H$_2$O, Product Number I110-500, Fisher Scientific, Fair Lawn, N.J.) was added to 99 g of 22.7 wt % ionomer casting dispersion with stirring for 24 hrs. The iron salt dissolved to give a clear casting dispersion. A membrane was cast according to the procedure given above. Table 1 reports the results of the Peroxide Soak Test and Acid Content Measurement for the membrane. Two samples were made and the reported results are the average of both samples.

Examples 2-4

10 g aliquots of the casting dispersion prepared according to Example 1C were further combined with varying amounts of cerium oxide (CeO$_2$, commercially available under the trade designation "Polishing Opaline," from Rhodia Electronics and Catalysis, Cranbury, N.J.), particle size 0.5-1.0 micron, and stirred for 24 hrs. Membranes were cast according to the procedure given above. Table 1 reports the results of the Peroxide Soak Test and Acid Content Measurement for these membranes. Two samples were made for each of Examples 2, 3 and 4 and the reported results are the average of both samples.

TABLE I

| Example | CeO$_2$ added (g) | wt % CeO$_2$ | Peroxide Soak Test (% weight change) | acid content (meq/g) |
|---|---|---|---|---|
| 1C | none | none | −14.5% | 1.02 |
| 2 | 0.0057 | 0.25 | −5.3% | 0.99 |
| 3 | 0.0114 | 0.50 | −3.7% | 0.99 |
| 4 | 0.0229 | 1.0 | −3.0% | 0.95 |

The addition of cerium oxide consistently reduced the weight loss of the perfluorinated ionomer, indicating a higher level of oxidative stability.

Comparative Example 5C

A control membrane was prepared according to details presented above, except that the casting dispersion included additional iron (500 ppm), added as iron nitrate. 0.081 g of ferric nitrate (Fe(NO$_3$)$_3$-9H$_2$O, (Product Number I110-500, Fisher Scientific, Fair Lawn, N.J.) was added to 99 g of 22.7wt % ionomer casting dispersion with stirring for 24 hrs. The iron salt dissolved to give a clear casting dispersion. A membrane was cast according to the procedure given above. Table II reports the results of the Peroxide Soak Test and Acid Content Measurement for the membrane. Two samples were made and the reported results are the average of both samples.

Example 6

An aliquot of casting dispersion prepared according to Example 5C was further combined with cerium oxide (CeO$_2$, Product Number 55322, Alfa Aesar, Ward Hill, Mass.) and stirred for 24 hrs. Membranes were cast according to the procedure given above. A membrane was cast according to the procedure given above. Table II reports the results of the Peroxide Soak Test and Acid Content Measurement for the membrane. The addition of cerium oxide reduced the weight loss of the perfluorinated ionomer, indicating a higher level of oxidative stability.

TABLE II

| Example | Peroxide Soak Test (% weight change) | acid content (meq/g) |
|---|---|---|
| 5C | −9.5% | 1.00 |
| 6 | −3.4% | 0.95 |

Comparative Example 7C

A control membrane was prepared according to the method described in Comparative Example 1C. Table m reports the results of the Peroxide Soak Test for the membrane. Two samples were made and the reported results are the average of both samples.

9

Example 8

An aliquot of polymer casting dispersion prepared according to Example 5C (measuring 23.3 wt % polymer and including 500 ppm iron) was further combined with an aqueous cerium oxide colloidal dispersion. 0.0329 g of 20 wt % $CeO_2$ colloidal dispersion (Product Number 12730, Alfa Aesar, Ward Hill, Mass.), particle size 10-20 nm, was added to 5.28 g of the polymer dispersion, with stirring. The mass amounts above yield 0.53 wt % $CeO_2$, or 0.031 meq Ce/g, relative to the total mass of $CeO_2$ and polymer. The mixture was stirred for 8 hrs to yield a turbid casting dispersion. A membrane was cast according to the procedure given above. Table III reports the results of the Peroxide Soak Test for the membrane. Two samples were made and the reported results are the average of both samples.

TABLE III

| Example | Peroxide Soak Test (% weight change) |
|---------|--------------------------------------|
| 7C | −14.6% |
| 8 | −3.7% |

Comparative Example 9C

A control membrane was prepared according to the method described in the Example of U.S. Pat. No. 6,649,295, incorporated herein by reference.

Example 10

MEA's were fabricated as described above from two membranes made as described for Example 2 and one made as described for Example 9C. FIG. 1 reports results from the Fuel Cell Lifetime Test for these MEA's, including cell potential for the Example 9C comparative MEA (Trace A1, left-hand scale), cell potential for the two Example 10 MEA's of the invention (Traces C1 and D1, left-hand scale), fluoride ion release rate for the Example 9C comparative MEA (Trace A2, right-hand scale), and fluoride ion release rate for the Example 10 MEA of the invention (Trace C2 and D2, right-hand scale). For comparison, FIG. 1 additionally reports cell potential and fluoride ion release rate for a comparative MEA made with a Mn salt additive (Traces B1 and B2). The Example 10 MEA's of the invention demonstrated dramatically extended lifetime and reduced fluoride ion evolution.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a fuel cell polymer electrolyte membrane comprising the steps of:
   a) providing a highly fluorinated polymer electrolyte comprising acidic functional groups, wherein said polymer electrolyte has an equivalent weight of less than 900;
   b) dispersing therein at least one cerium oxide compound in an amount so as to provide between 0.01 and 5 percent of the total weight of said polymer electrolyte membrane, wherein the at least one cerium oxide compound is uniformly distributed in the highly fluorinated polymer electrolyte, such that the distribution of the at least one cerium oxide therein does not vary more than +/−20 percent; and c) thereafter forming a polymer electrolyte membrane comprising said polymer electrolyte.

2. A method of making a fuel cell membrane electrode assembly comprising the method according to claim 1, and additionally comprising the step of:
   d) forming a membrane electrode assembly comprising said polymer electrolyte membrane.

3. The method according to claim 1 wherein said highly fluorinated polymer electrolyte is perfluorinated.

4. The method according to claim 1 wherein said at least one cerium oxide compound provides between 0.1 and 1 percent of the total weight of said polymer electrolyte membrane.

5. The method according to claim 1 wherein said at least one cerium oxide compound provides between 0.2 and 0.3 percent of the total weight of said polymer electrolyte membrane.

6. The method according to claim 1 wherein said at least one cerium oxide compound is present in an amount of less than 1% by volume relative to the total volume of said polymer electrolyte membrane.

7. The method according to claim 1 wherein said at least one cerium oxide compound is $CeO_2$.

8. The method according to claim 1 wherein said at least one cerium oxide compound is $Ce_2O_3$.

9. The method according to claim 1, wherein said polymer electrolyte comprises pendant groups according to the formula:

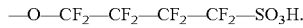

$$-O-CF_2-CF_2-CF_2-CF_2-SO_3H.$$

10. The method according to claim 1, wherein said polymer electrolyte comprises pendant groups according to the formula:

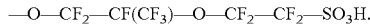

$$-O-CF_2-CF(CF_3)-O-CF_2-CF_2-SO_3H.$$

11. A fuel cell membrane electrode assembly comprising a polymer electrolyte membrane which comprises a highly fluorinated polymer electrolyte and at least one cerium oxide compound dispersed therein, wherein the at least one cerium oxide compound is uniformly distributed in the highly fluorinated polymer electrolyte, such that the distribution of the at least one cerium oxide compound therein does not vary more than +/−20 percent, and wherein said highly fluorinated polymer electrolyte has an equivalent weight of less than 900.

12. The fuel cell membrane electrode assembly according to claim 11 wherein said highly fluorinated polymer electrolyte is perfluorinated.

13. The fuel cell membrane electrode assembly according to claim 11 wherein said at least one cerium oxide compound is present in an amount of between 0.01 and 5 weight percent relative to the total weight of said polymer electrolyte membrane.

14. The fuel cell membrane electrode assembly according to claim 11 wherein said at least one cerium oxide compound is present in an amount of between 0.1 and 1 weight percent relative to the total weight of said polymer electrolyte membrane.

15. The fuel cell membrane electrode assembly according to claim 11 wherein said at least one cerium oxide compound is present in an amount of between 0.2 and 0.3 weight percent relative to the total weight of said polymer electrolyte membrane.

16. The fuel cell membrane electrode assembly according to claim 11 wherein said at least one cerium oxide compound is present in an amount of less than 1% by volume relative to the total volume of said polymer electrolyte membrane.

17. The fuel cell membrane electrode assembly according to claim 11 wherein said at least one cerium oxide compound is $CeO_2$.

18. The fuel cell membrane electrode assembly according to claim 11 wherein said at least one cerium oxide compound is $Ce_2O_3$.

19. The fuel cell membrane electrode assembly according to claim 11 wherein said polymer electrolyte has an equivalent weight of 800 or less.

20. The fuel cell membrane electrode assembly according to claim 11 wherein said polymer is crosslinked.

21. The fuel cell membrane electrode assembly according to claim 11, wherein said polymer electrolyte comprises pendant groups according to the formula:

$$-O-CF_2-CF_2-CF_2-CF_2-SO_3H.$$

22. The fuel cell membrane electrode assembly according to claim 11, wherein said polymer electrolyte comprises pendant groups according to the formula:

$$-O-CF_2-CF(CF_3)-O-CF_2-CF_2-SO_3H.$$

* * * * *

UNITED STATES PATENT AND TRADEMARK OFFICE
CERTIFICATE OF CORRECTION

| | |
|---|---|
| PATENT NO. | : 8,367,267 B2 |
| APPLICATION NO. | : 11/261053 |
| DATED | : February 5, 2013 |
| INVENTOR(S) | : Matthew H Frey |

It is certified that error appears in the above-identified patent and that said Letters Patent is hereby corrected as shown below:

In the Specifications:

Column 8
Line 64, delete "m" and insert -- III --, therefor.

Signed and Sealed this
Fourteenth Day of May, 2013

Teresa Stanek Rea
*Acting Director of the United States Patent and Trademark Office*